United States Patent [19]
Winter

[11] 3,870,340
[45] Mar. 11, 1975

[54] TOW HITCH FOR FIFTH WHEEL TYPE TRAILER
[76] Inventor: Charles M. Winter, 2580 W. Philadelphia St., York, Pa. 17404
[22] Filed: May 30, 1973
[21] Appl. No.: 365,288

[52] U.S. Cl. ........ 280/415 B, 280/34 R, 280/423 R, 280/476, 280/495
[51] Int. Cl. ............................................. B62d 53/08
[58] Field of Search ........ 280/405 R, 405 A, 423 R, 280/476, 495, 34 R, 400, 415 R, 415 B; 296/23 R

[56] References Cited
UNITED STATES PATENTS

| | | | |
|---|---|---|---|
| 2,460,466 | 1/1949 | Nogle | 280/476 R |
| 2,592,219 | 4/1952 | West et al. | 280/476 R |
| 2,682,420 | 6/1954 | Chelf | 280/423 R X |
| 3,390,896 | 7/1968 | Philapy | 280/423 R |
| 3,392,992 | 7/1968 | Baker et al. | 296/23 R X |
| 3,544,128 | 12/1970 | Storm | 280/400 X |
| 3,664,679 | 5/1972 | Hille | 280/81 R |

Primary Examiner—Leo Friaglia
Assistant Examiner—R. Schrecengost
Attorney, Agent, or Firm—C. Hercus Just

[57] ABSTRACT

A tow hitch adapted to be secured to the rearward portion of automotive vehicles and especially passenger type vehicles, said tow hitch being adapted to have a fifth wheel type trailer connected thereto by means of a hitch frame supported by auxiliary wheels immediately rearward of the rear end of said automotive vehicle and connected to the chassis frame members of the vehicle by interfitting projection and socket means. One embodiment of the structure comprises a cantilever frame adapted to overlie the rearward portion of the upper surface of the trunk section of an automotive vehicle, thereby minimizing the overall length of a connected vehicle and trailer. A second embodiment of the invention comprises upstanding means on said hitch frame directly supporting a transverse hitch member for connection of the forward end of a fifth wheel trailer thereto and thereby readily permit access to the trunk of said vehicle by permitting the deck cover to be raised. The aforementioned cantilever frame also being supported for pivotal movement upward and rearward in a manner to permit the same to support loads when extending rearwardly. Means are also provided whereby the coupling means are adapted to be connected to a wide range of different widths of chassis frames of various vehicles while utilizing a hitch frame of standard width and, correspondingly, a limited number of different arrangements of supporting means for the cantilever frame are possible to enable the cantilever frame to be disposed at a reasonable range of different angles to support the forward ends thereof in spaced relation to a range of different shapes and heights of deck structures on the trunk areas of various automotive vehicles.

20 Claims, 17 Drawing Figures

TOW HITCH FOR FIFTH WHEEL TYPE TRAILER

CROSS REFERENCE TO RELATED APPLICATION

The present invention comprises a further development in hitch mechanism for connecting a fifth wheel type trailer to automotive vehicles and especially passenger type automotive vehicles. Same development is based upon similar objectives but different executions of details over the subject matters of applicant's prior application Ser. No. 283,822, filed Aug. 23, 1972, now U.S. Pat. No. 3,790,189, entitled Trailer Hitch for Passenger Motor Vehicle, and Ser. No. 314,952, filed Dec. 14, 1972, now U.S. Pat. No. 3,834,735 and entitled Trailer Hitch Mechanism.

BACKGROUND OF THE INVENTION

Due to the much greater weight of fifth wheel trailers than conventional trailers which normally are connected to the rear ends of vehicles by ball and socket means, it has been necessary in recent years to devise different means for connecting such fifth wheel trailers to vehicles by which the same are propelled along highways. At present, it is common to transport such vehicles by means of pick-up trucks having readily and decks or floors to relatively light various types of frame structures are connected to support a fifth wheel hitch. An example of such a hitch is shown in prior U.S. Pat. No. 2,925,286, to Hodges Jr. et al., dated Feb. 16, 1960.

Another example of fifth wheel type trailer hitch mechanism which is supported by the deck or body of a truck vehicle comprises the subject matter of U.S. Pat. No. 3,390,896, to Philapy, dated July 2, 1968. Although said patent, in FIG. 4, shows a fifth wheel type trailer attached to a passenger-type vehicle, in order to accomplish this, the cover of the trunk has to be modified and the trailer is a relatively light weight type which can be supported by conventional rear wheels of a passenger-type vehicle without requiring auxiliary wheel support.

Although the supporting capabiities of pick-up trucks having open deck areas are highly suited for purposes of transporting fifth wheel type trailers and especially those of substantial size which, in general, are far too heavy to have the front end thereof supported by the rear portion of conventional passenger-type vehicles for example, such as a sedan, there is an underlying difficulty in utilizing such pick-up trucks. This comprises the fact that only a very limited number of passengers, such as about three at the maximum can be accommodated in the cab of such pick-up truck and this restricts the number of persons who can use the trailer due to that at least in many states, passengers are prohibited by law from riding in trailers and must ride in the tractor, or the vehicle, whether a pick-up truck or a passenger automobile. Even in the cabs of pick-up trucks, three adults are frequently crowded when seated therein and therefore it is the principal purpose of the present invention to provide hitch means adapted to be connected by convenient means to the rearward end of a conventional passenger-type motor vehicle, such as a sedan having a rear trunk and especially a sedan of the four-door type, and providing said hitch mechanism with auxiliary wheel means to minimize the strain and wear imposed upon the rear springs and rear wheels of such passenger-type vehicle.

To provide an appreciation of efforts made heretofore to connect the forward ends of trailers to propelling vehicles, attention is directed to U.S. Pat. No. 2,212,081, to Spires, dated Aug. 20, 1940 and in which tongue means are provided on the forward end of a trailer, said tongue extending into the floor of the trunk area of a coupe. Such arrangement imposes a substantial load upon the rear springs and rear wheels of such vehicle, not withstanding the fact that the trailer illustrated in the patent is not of the fifth-wheel type.

Various types of so-called trailer dollies also have been provided heretofore, especially for connection to ball and socket type hitch means between the rear end of a motor vehicle and the forward end of a trailer. Such dollies employ supporting wheels which are connected in various ways to the hitch mechanism. One example of this type of dollie is illustrated in U.S. Pat. No. 2,463,926, to Ward, dated Mar. 8, 1949. In general, while dollies of this type provide reasonable vertical support, they provide only limited stability with respect to guided movement.

U.S. Pat. No. 3,393,922, to Adams, dated July 23, 1968 pertains to auxiliary support for a camper fixedly connected to the deck of a pick-up truck in conventional manner, the auxiliary support affording only vertical support to the rear end of said camper and having no suggestion of supporting a fifth wheel trailer.

U.S. Pat. No. 3,544,128, to Storm, dated Dec. 1, 1970, provides auxiliary support, including additional wheels, for use with a conventional pick-up truck and thereby supplement the supporting ability of the springs and conventional rear wheels of said truck, no means being provided on the structure for supporting a trailer of any kind.

U.S. Pat. No. 3,664,679, to Hille, dated May 23, 1972, illustrates a camper type arrangement supported on the bed of a pick-up truck and auxiliary wheels being mounted on a frame extending rearwardly from the truck chassis by means of a supplemental frame, without having any suggestions for supporting a fifth wheel trailer, the device primarily comprising stabilizing means for the pick-up truck.

The present invention has been devised specifically to provide auxiliary support for the forward end of a fifth wheel trailer by connecting the same to the rear end portion of an automotive vehicle and especially one of the sedan, passenger-type in a manner to permit the vehicle to support a normal passenger load of five or six individuals and also supporting the forward end of the fifth wheels trailer without placing undue strain on the rear springs and normal wheels of said vehicle and affording substantial stability to prevent whiplashing and other undesirable movement. The means by which this is accomplished are set forth in the following objectives and details thereon are described in the ensuing specification.

SUMMARY OF THE INVENTION

It is the principal object of the present invention to provide a tow hitch mechanism for attachment to the rear end portion of the chassis of automotive vehicle, such as a sedan, and comprising a hitch frame having auxiliary wheels to support the same in a vertical manner, a fifth wheel hitch supported by the upper portion of said hitch frame, and coupling means including interengageable members respectively connected to said hitch frame and the rear portion of the chassis frame members of the vehicle, thereby transmitting the load of the forward end of a fifth wheel trailer directly to said auxiliary wheels through said connection to said hitch frame to said chassis frame of the vehicle.

It is another object of the invention to provide said hitch frame with upstanding members at opposite sides thereof and the fifth wheel hitch extending between the upper ends of said upstanding members which are substantially vertically above the axes of the auxiliary wheels which support said hitch frame.

It is a further object of the invention to provide a cantilever frame which is connected to and extends forwardly from the upstanding members of said hitch frame and overlies the upper surface of the rear trunk portion of an automotive vehicle, thereby minimizing the overall length of the connected automotive vehicle and fifth wheel trailer.

Another object of the invention is to pivotally connect a cantilever frame to said hitch frame for movement between a forwardly extending position and a rearwardly extending position for supporting a supplemental load.

Still another object of the invention is to provide cap shells respectively connectable to the upper ends of said upstanding members at opposite sides of said hitch frame and position forwardly and upwardly extending abutment members on one side of each cap member for flat engagement by opposite side members on said cantilever frame when extending forwardly in cantilever fashion over the trunk area of an automotive vehicle, said cap members being adapted to have said abutment member connected thereto, such as by welding, at different angles respectively to adapt said abutment members for contact by cantilever frames having forward ends disposed at different heights to acommodate the same to different shapes and heights of trunk areas of automotive vehicles of different makes and sizes, thereby adapting said hitch mechanism to various shapes and makes of automotive vehicles by necessitating only a variety of cap members and abutment members thereon respectively adapted to standard sizes of hitch frames and cantilever members.

Still another object of the invention is to provide coupling means for connecting the hitch frames of said hitch mechanisms to different makes and types of automotive vehicles respectively having chassis frame members spaced apart different distances, said coupling means comprising interfitting socket members and projection members, the projection members preferably extending forwardly from the forward ends of the hitch frame and being spaced apart a fixed, predetermined transverse distance, while the socket members are adapted to be supported by longitudinally extending means connectable,preferably substantially in a permanent manner, to the rearward portions of the chassis frame members of an automotive vehicle, said socket members being adapted to be connected to said attaching means in different relationships in a lateral direction to adapt the socket members for reception of the projecting members on said hitch frame while disposing said attaching members in position to be connected to the chassis frame members of the vehicle by suitable bracket means comprising ears, for example, which flatly abut a face of said chassis frame members, A still further object of the invention is to provide the hitch frame of said toe hitch mechanism with transversely spaced longitudinal members at opposite sides of the frame to which upstanding side members are connected, and provide bearings on the lower portions of said longitudinal members to pivotally support an axle for auxiliary wheels, said projection members of the coupling means extending forwardly from the forward ends of said longitudinal members of said tow hitch frame for reception within the socket members connecting to the chassis frame members of the vehicle, and safety coupling means, such as transverse pins, extending through said projection members and walls of said socket members to prevent unwanted separation of the interfitting coupling members.

Details of the foregoing objects and of the invention, as well as other objects thereof, are setforth in the following specification and illustrated in the accompanying drawings comprising apart thereof.

DETAILED DESCRIPTION

Figure 1:
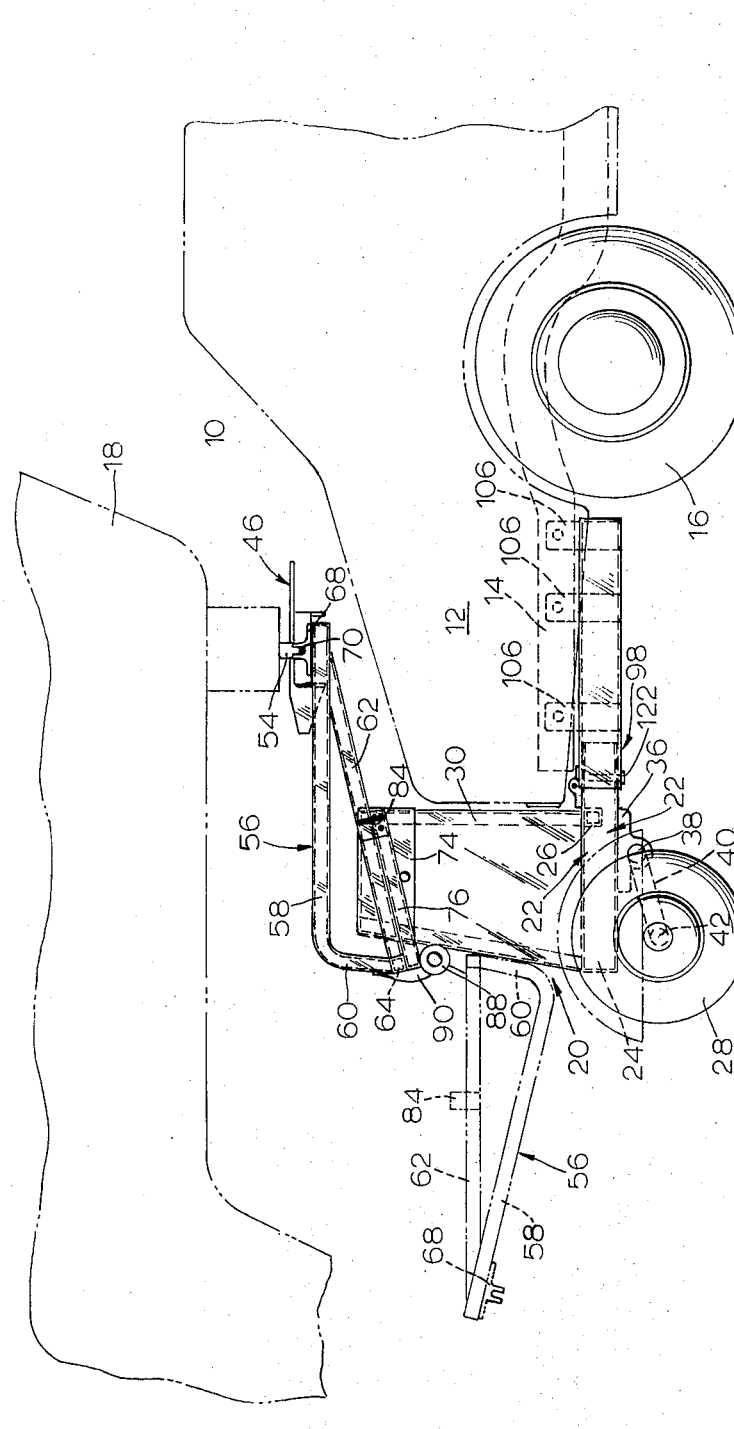
FIG. 1 is a side elevation of a fragmentarily illustrated rear portion of an automotive vehicle and a fragmentarily illustated portion of the front end of a fifth wheel trailer, said figure showing an exemplary cantilever type hitch means for connecting the forward end of said fifth wheel trailer to the rear end portion of said automotive vehicle and support the cantilever type hitch mechanism by auxiliary wheel, the cantilever frame being shown in full lines in forward, trailer-supporting position, and in phantom, being shown in rearwardly extending position for access to the trunk of the vehicle and also in position to support additional load means.

As indicated above, the present invention pertains to a two hitch mechanism for attaching a fifth wheel type trailer to the rear portion of the chassis of an automotive vehicle. Referring to FIG. 1, the rear portion of an automotive vehicle 10 is shown in phantom to illustrate one type and shape of trunk compartment 12 at the rear end of said vehicle. Also, the rear chassis frame members 14 of the vehicle are shown in dotted lines in view of the fact that they normally are enclosed by the skirt of the fender at each side of the trunk compartment 12. The conventional rear wheels 16 of the vehicle also are shown, said wheels being of a conventional nature and supported either by leaf-type springs or coiled springs, not shown, in accordance with various makes and types of automotive vehicles.

It is desirable that the vehicle be provided with means to connect the forward end of a fifth-wheel type trailer 18 thereto, only the forward portion of which is shown in phantom, fragmentarily, in FIG. 1. In general however, the overall length of a conventional fifth wheel type trailer is very substantially greater than the overall length of a conventional passenger type vehicle 10 and especially one of a sedan type adapted to contain as many as five or six passengers to ride therein in comfort.

Accordingly, due particularly to the substantial weight of at least the forward end portion of a fifth wheel type trailer 18, it is impractical to connect the fifth wheel thereof to a hitch directly supported by the conventional rear end portion of an automotive vehicle and depend upon conventional or even extra strength springs and the normal rear wheels of the vehicle to support the trailer safely and without imposing undue wear and strain upon the vehicle as well as permitting the vehicle to be subjected to whiplash at least on occasions during towing of such a trailer of greater weight. Accordingly, the present invention provides a tow hitch mechanism 20 which is especially adapted to be connected to the rear portion of the chassis frame members of the automotive vehicle 10 and include means to support the fifth wheel by which the trailer is connected to the vehicle, the hitch mechanism including auxiliary wheels which very substantially augment the supporting power of the conventional wheel 16. Details of such tow hitch mechanism, including several embodiments thereof, are as follows.

Figure 2:
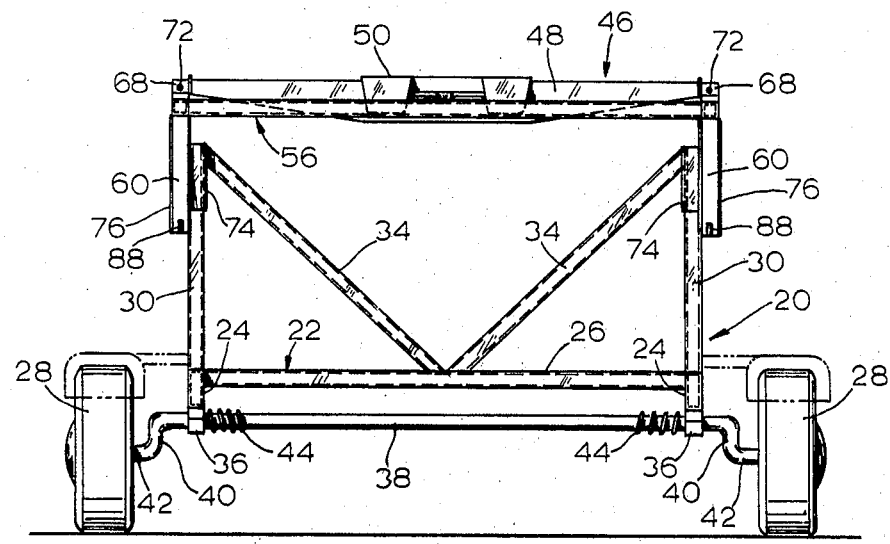
FIG. 2 is a rear elevation of the cantilever hitch mechanism shown in FIG. 1 with the cantilever frame in operative position.
Figure 3:
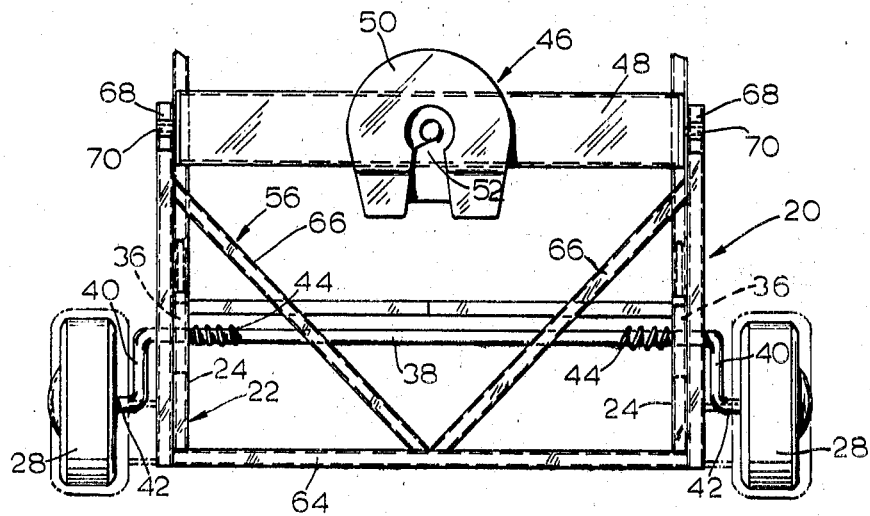
FIG. 3 is a top plan view of the cantilever type hitch mechanism shown in FIG. 2.

Referring to FIGS. 1-3, the tow hitch mechanism 20 comprises a hitch frame 22 composed of a pair of side members 24 which are connected together in transversely spaced relationship by a cross frame member 26, the opposite ends of which are welded to the side members 24 adjacent the forward ends thereof. For strength, compared with weight, it is preferred that the side member 24 and cross member 26 be formed from steel tubing of either square or rectangular shape in cross section. The width of the hitch frame 22 preferably is somewhat less than that of the rear end of the vehicle 10 for reasons described hereinafter. One of said reasons is to enable the auxiliary wheels 28, which are connected to the hitch frame 22 by means described hereinafter, to be spaced transversely apart a distance substantially equal to that which the conventional rear wheels 16 of the vehicle 10 are spaced apart. However, if desired, especially for greater stability, the auxiliary wheels 28 may be spaced apart a somewhat greater distance than that of the conventional wheel 16 of the vehicle.

The hitch frame 22 is provided at opposite sides thereof with upstanding vertical end members 30 which, in the preferred construction, are formed from sheet steel. In side elevation, as viewed in FIG. 1, it will be seen that the front and rear edges of the members 30 are tapered slightly with respect to each other, the forward edge preferably being substantially vertical, while the rearward edge extends inward at the top toward the forward edge. In cross section, the members are shaped as shown in exemplary manner in FIG. 4A, wherein it will be seen that the opposite edges of the outer panels are turned inwardly from the same surface and the terminal ends 32 are each bent inwardly toward each other a limited distance to provide substantial rigidity to said member. The lower ends of the members 30 are secured firmly to the side members 24 of hitch frame 22, such as by welding. The upper ends thereof also are braced, as seen in FIG. 2, by angular brace members 34 which extend between the midpoint of cross frame member 26 and the upper ends of the members 30, such as by welding. The brace members 30 also preferably are channels and of suitable cross sectional shape.

Connected to the lower surfaces of the side members 24 are suitable bearings 36 of the conventional nature through which opposite end portions of an auxiliary axle 38 extend, the end portions of the axle 38 being offset transversely to provide extensions 40 which terminate in horizontally extending stub axles 42 which support said auxiliary wheels 28 rotatably. Coil springs 44 of very substantial strength respectively surround the axle 38 and the innermost ends of said springs are secured firmly, such as by welding, to the axle 38, while the outer ends thereof are secured suitably within sockets in the bearings 36 for example. As best shown in FIG. 1, it will be seen that the axle extentions 40 extend rearwardly and downwardly and the coils of the spring 44 extend in a direction and are tensioned so as to resist upward movement of the stub axles 42 and the wheels 28 connected thereto, thereby greatly augmenting the conventional springs by which the wheels 16 are interconnected to the chassis frame members 14 of the vehicle 10.

The purposes of the hitch frame 22 and the upstanding end members 30 thereon is to support one of several types of fifth wheel hitch 46 which essentially comprises a transversely extending member 48 upon which a conventional fifth wheel 50 is mounted. The fifth wheel 50 also includes a conventional latch member 52 by which a conventional fifth wheel spindle 54, see FIG. 1, is retained.

One of the embodiments of fifth wheel supporting means is illustrated in FIGS. 1-3 and comprises a supplemental cantilever frame 56 which comprises similar side members 58 having downwardly extending rearward ends 60 to the lower ends of which a forwardly and upwardly extending frame member 62 is connected at one end, the opposite end thereof being connected to the forward end of side member 58. It will be understood that a composite frame of the type described is disposed respectively at each side of the cantilever frame 56. The rearward ends of the aforementioned side frame members of the cantilever frame 56 are connected by a transverse frame member 64, of similar nature to the side members 58 of tubular steel, and said composite side frame members are braced at their forward ends with respect to the frame member 64 by diagonal brances 66 best shown in FIG. 3. The forward ends of the composite side frame members of cantilever frame 56 also support bearing yokes 68 which respectively receive supporting trunnions 70 which project axially from opposite ends of the transverse member 48 of the fifth wheel hitch 46. Suitable latching pins 72 of conventional nature extend across the tops of the trunnions 60 within the yokes 68 as a safety precaution.

For purposes of disposing the forward ends of the opposite sides of the cantilever frame 56 at a desired elevation above the upper exterior surface of trunk compartment 12, and particularly with regard to recognizing that such surfaces vary in height and shape between different makes and sizes of automotive vehicles, the present invention provides positioning and supporting means for the cantilever frame of such nature that, with a minimum of inventory, while employing a substantially uniform and standard shape and size of basic hitch frame 22, such frame readily may be used with a wide range of different sizes and shapes of automotive vehicles and support the fifth wheel hitch 46 at a suitable elevation immediately above the upper surface of the trunk compartment 12 of each individual vehicle. Details of such means are as follows.

Figures 14, 15:
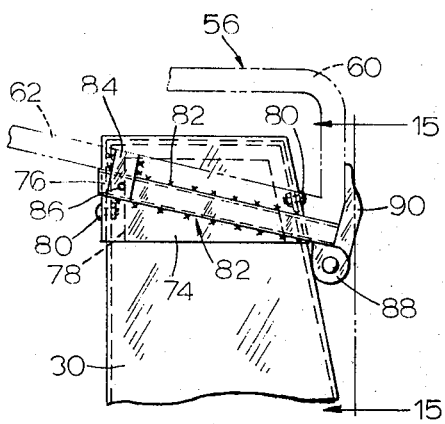
FIG. 14 is a fragmentary side elevation of the upper portion of one of the upstanding members at one side of the hitch frame embodying the principals of the present invention and illustrating a detachable cap shell upon which an abutting member for one side of the cantilever frame is arranged at a predetermined angle to accommodate the cantilever frame to one type of automotive vehicle.
FIG. 15 is a side elevation of the arrangement shown in FIG. 14 as seen on the line 15—15 thereof.
Figure 16:
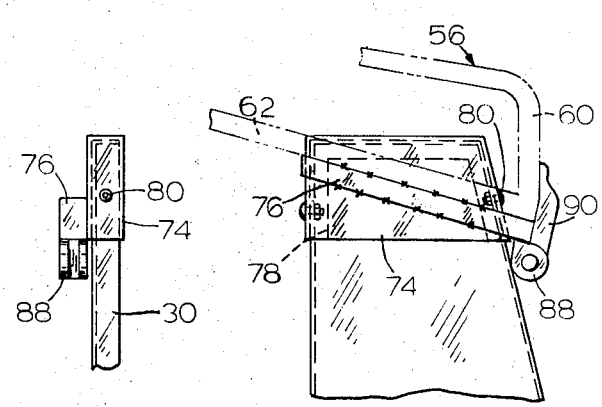
FIG. 16 is a view similar to FIG. 14 but showing the abutment member disposed at a different angle from that shown in FIG. 14 on the cap shell which is connectable to the upper end of the upstanding member at each side of the hitch frame.

In accordance with the principals of the present invention, the cantilever frame 56 is connected to and supported by the upper end portions of the vertical end members 30 of the hitch frame 22 by employing a cap members 30 of the hitch frame 22 by employing a cap shell 74 which is formed from sheet metal similar to that from which the end members 30 are formed, for example, said shell having a panel, best shown in FIGS. 1 and 14-16, which extends downwardly along the outer surfaces of the end members 30 and overlies the same, said outer panel extending downwardly from the upper ends of the end members 30 a limited distance adequate to connect to the outer surface of each of the shells 74 and angularly extending abutment support members 76 which are shown in FIG. 1 in exemplary manner and in greater detail in FIGS. 14–16. Particularly from FIG. 15, it will be seen that the shells 74 extend around the forward, rearward and upper surfaces of the end members 30, terminating in flanges 78 which overlie the inner surfaces of the end members 30 and thus provide firm, enclosing engagement of the shells 74 relative to the upper ends of the end members 30. Suitable bolts 80 may be employed at desired locations to effect firm connection of the cap shells 74 with the upper ends of the end members 30.

Referring to FIGS. 1 and 14 for exampile, it will be seen that the abutment support member 76 is disposed at a predetermined angle extending upwardly and forwardly with respect to the horizontal. The members 76 may be firmly attached to the outer surfaces of the cap shells 74 by any suitable means such as weldments 82. Each different make and model of automotive vehicles will require the angular position of the cantilever frame 56 to be selected so that the forward end of the cantilever frame will be spaced above the upper surface of the trunk compartment 12. Thus, to enable that the present invention to employ a substantially standard size and arrangement of hitch frame 22, while at the same time enabling the same to accommodate said hitch frame being connected to a variety of different sizes and shapes of trunk compartments in particular of automotive vehicles, the provision of the cap shell 74 for connection to the upper ends of the relatively fixed shape and design of hitch frame 22 solves the problem very effectively by requiring a dealer to stock only a limited number of different arrangements of cap shells 74 having abutment support member 76 affixed thereto in different angular relationships respectively selected to accommodate each of said different cap shell arrangement to a particular make and model of automotive vehicle for example. To demonstrate this principal, attention is directed to FIG. 16 in which a different angular relationship is shown between cap shell 74 and abutment support member 76. Other angular relationships between the abutment support members 76 and cap shells 74 are possible, as required by individual automotive vehicles but under such circumstances, a dealer will have to stock only sets of left hand and right hand cap shells with selected angularly related abutment support members 76 thereon, all of which are adapted to be quickly connected to the upper ends of the end members 30 of the aforementioned standard size of hitch frame 22.

To secure the cantilever frame 56 in desired, forwardly extended supporting position for the fifth wheel hitch 46, a suitable locking ear 84 is fixed to each of the frame members 62 of the cantilever frame 56 and extend downwardly therefrom for reception of a suitable bolt or locking pin 86 as shown in FIG. 14, which extends through the forward end of the abutment support member 76 for example.

The rearward end of the abutment support members 76 have part of a heavy duty hinge 88 connected thereto, another portion 90 of said hinge 88 extending upwardly and being connected to the downwardly extending ends 60, for example, of side members 58 of the cantilever frame 56. By such hinge means which respectively are at opposite sides of the hitch frame 22, the cantilever frame 56 is pivotally movable between a forwardly extending, fifth wheel supporting position shown in full lines in FIG. 1 and a rearwardly extending, lower position shown in phantom in FIG. 1. When disposed in the rearwardly extending phantom position, the ends 60 of the side members 58 of the cantilever frame 56 are disposed in abutting relationship with the outer surface of the rearward edge of the end members 30. This arrangement is fully adequate to firmly support particularly the frame members 62 of the cantilever frame in a substantially horizontal position in which they are capable of supporting additional loads, either with or without the use of a platform, for example, not shown.

Figure 4:
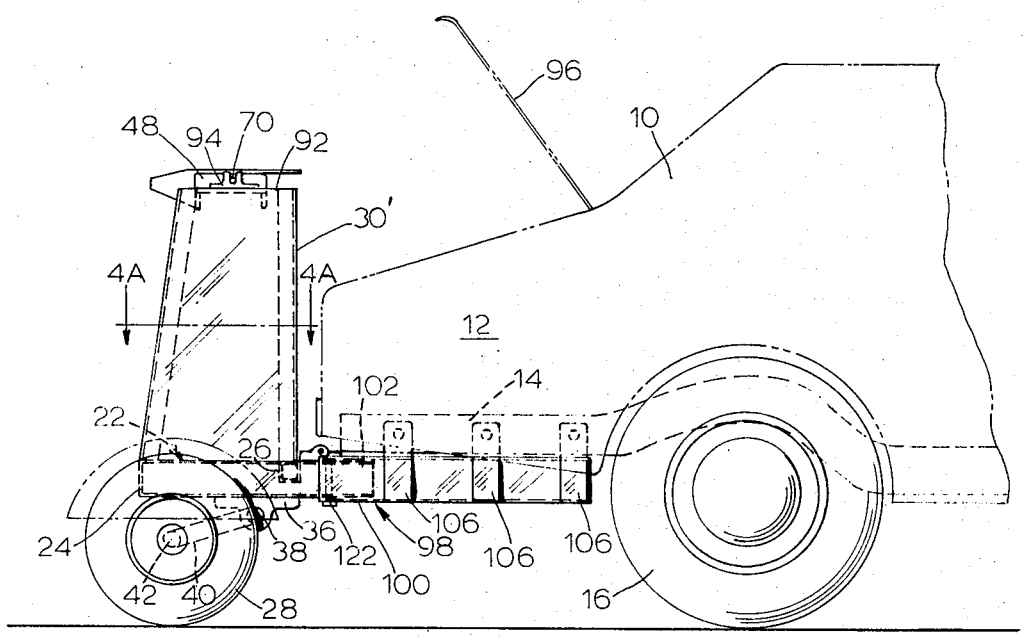
FIG. 4 is a modified hitch frame structure basically similar to that shown in FIGS. 1–3 but omitting the cantilever frame and directly supporting the transverse fifth wheel hitch member by the upper ends of the upwardly extending side members of the hitch frame, thereby permitting ready access to the trunk of the vehicle without disturbing connection of the trailer to the hitch mechanism.
Figure 4A:
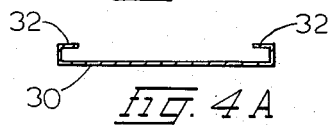
FIG. 4A is an exemplary sectional view of one of the upright side members of the hitch frame, as seen on the line 4A—4A of FIG. 4.
Figure 5:
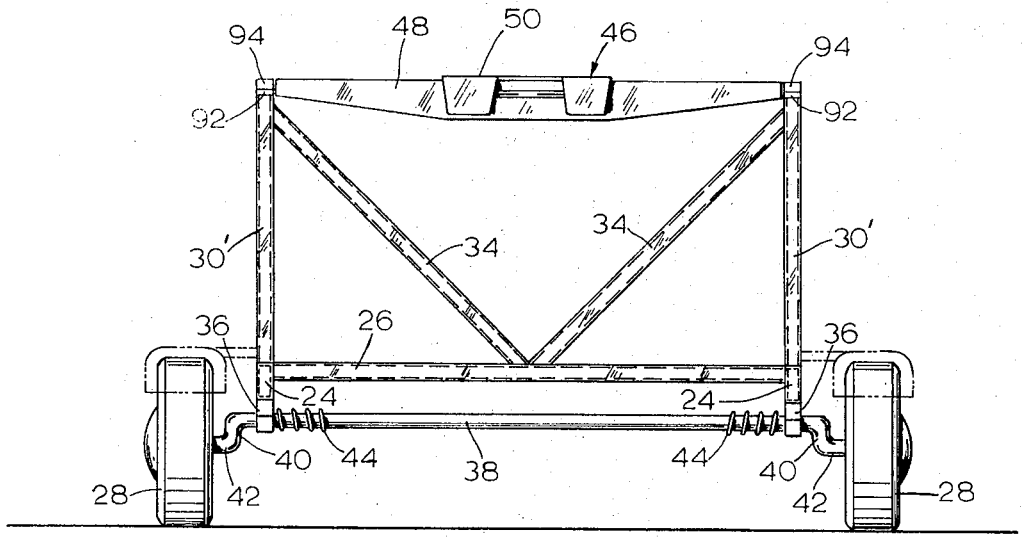
FIG. 5 is a rear elevation of the embodiment of hitch mechanism illustrated in FIG. 4.

Another arrangement for mounting a fifth wheel hitch 46 without employing a cantilever frame is shown in FIGS. 4 and 5. In this embodiment, the fundamental elements of the hitch frame 22 shown therein are substantially the same as the equivalent members in the embodiment shown in FIGS. 1–3. However, in the embodiment of FIGS. 4 and 5, the end members 30' which extend upwardly from the side members 24 of the hitch frame 22 extend upwardly a greater distance than the end members 30 of the preceding embodiment. This is due to the fact that the upper ends 22 of end members 30' directly support the bearing yokes 94 for the reception of the trunnions 70 connected to opposite ends of the transverse member 48 of the fifth wheel hitch 46, as best shown in FIG. 5. Thus, the upper ends 92 of the end members 30' must support the fifth wheel 50 at the same elevation that the cantilver frame 56 supports the same in the embodiments shown in FIGS. 1–3, whereby such additional height of the end members 30' are required. Otherwise, the embodiment shown in FIGS. 4 and 5 function simarily to that shown in FIGS. 1–3 except that in the embodiment of FIGS. 4 and in which the forward end of the fifth wheel type trailer does not overlie the top of the trunk compartment 12, it will be seen from FIG. 4 that the deck cover 96 of the trunk compartment 12 may be raised without disturbing the connection of the fifth wheel type trailer with the tow hitch unit comprising this embodiment of the present invention.

Further to minimize the inventory of means required to connect or couple the tow hitch mechanism 20 of the present invention with the rear portions of the chassis frame members of a reasonable range of different makes, shapes and sizes of automotive vehicles and especially those in which the rear portions of the chassis frame members are spaced transversely different distances, the present invention include coupling means 98 which are illustrated in general in FIGS. 1 and 4 but are shown in greater detail in FIGS. 6–12. The coupling means 98 comprise essentially horizontally extending and rearwardly opening socket members 100 which receive projection members 102 which preferably comprise forwardly directed extensions of the side members 24 of the hitch frame 22 for example. As required, the length of the projection members may be of the order of between 8 and 12 inches, such examples of length being for illustrative purposes, however, rather than being restrictive. It is preferred that the socket members 100, in cross section, be either square or rectangular and the cross sectional shape of the projection members 102 are closely complementary to provide effective connection of the hitch frame 22 to the rear end portions of the chassis frame members 14 in a manner to resist bending in any direction laterally with respect to the longitudinal axis of the frame members 14. Thus, particularly to provide adequate strength, commensurate with lightness of weight, steel tubing is preferably utilized to form the socket members 100 and also the projection members 102, the outer dimensions of the latter being closely equal to the interior dimensions of the socket members 100, there being only a slight difference in these dimensions adequate to permit a sliding fit between said members.

Figure 6:
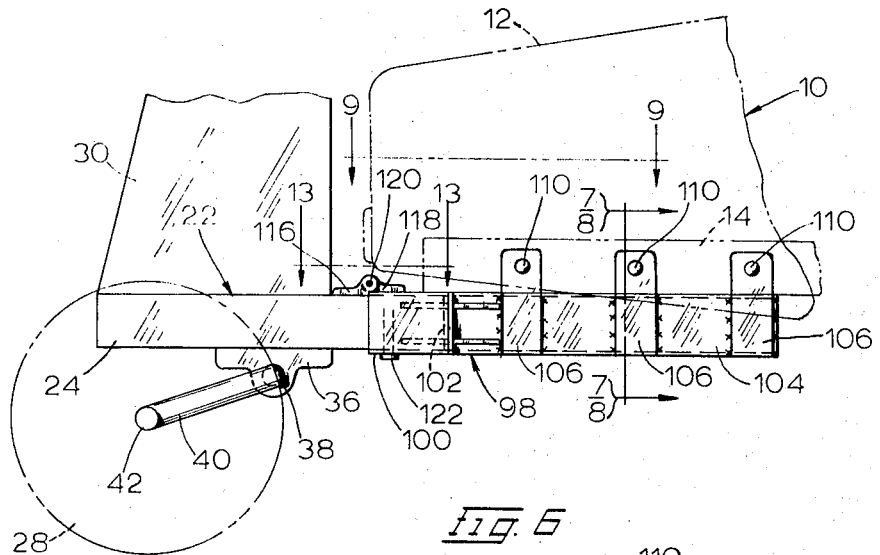
FIG. 6 is a fragmentary side elevation of the rear portion of an automotive vehicle and lower portion of a tow hitch mechanism of the type illustrated in FIGS. 1–5 and showing in greater detail than in said preceding figures means by which the hitch frame of the mechanism is connected to the rear chassis frame portions of the vehicle FIGS. 7 and 8 respectively are fragmentary vertical sectional views shown on the lines 7, 8–7, 8 of FIG. 6 and respectively showing different arrangements of the bracket members with respect to the longitudinally extending attaching means which are connected to the chassis frame members in different positions to illustrate the versatility of the invention in adapting a standard, fixed width of hitch frame to chassis members of different makes and styles of automotive vehicles having chassis frame members spaced apart different distances.
Figures 7, 8:
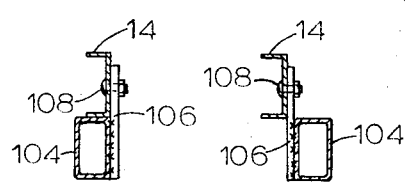

The socket members 100 are connected to and supported by the rear end portions of the chassis frame members 14 by means of elongated support members 104 which, preferably, are formed from steel tubing of either square of rectangular configuration in order that the same will be provided with outer surfaces adapted to have aligned abutting relationship longitudinally with surfaces of the chassis frame members 14 for example, as illustrated in exemplary manner in FIG. 7. The support members 104 are provided with connecting means in the form of brackets comprising vertical plates 106 which, for example, are welded at the lower ends thereof to one outer face of the members 104, as shown in exemplary manner in FIGS. 6–8. The bracket plates 106 are spaced longitudinally along the elongated support members 104 in accordance with conventional holes normally formed in the rearward portions of the chassis frame members 14, whereby no drilling of additional holes in the chassis frame members is required. Such conventional holes in the chassis frame members are used for various purposes during the fabricatin of the chassis frames of automotive vehicles and such holes are utilized to accommodate connecting bolts 108, shown in exemplary manner in FIGS. 7 and 8, the upper ends of the bracket plates 106 having holes 110 therein to receive said bolts, the holes 110 being axially aligned with said aforementioned holes originally formed in the chassis frame members 14.

Figures 9, 10:
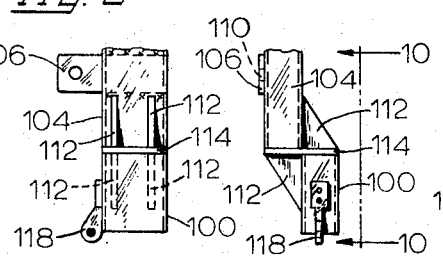
FIG. 9 is a fragmentary top plan view of the rearward portion of an elongated member of the attaching means and a socket member thereon of the type shown in FIG. 6 as seen on the line 9—9 thereof.
FIG. 10 is a fragmentary side elevation of the fragmentary portion of the attaching means shown in FIG. 9 as seen on the line 10—10 thereof.
Figure 11:
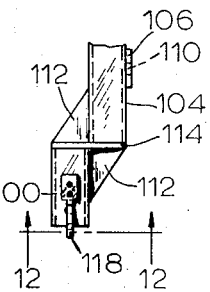
FIG. 11 is a view similar to FIG. 9 but showing a different position of the socket member with respect to the fragmentarily illustrated portion of the elongated member of the attaching means.
Figure 12:
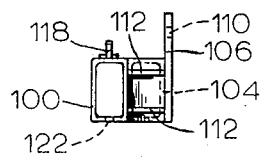
FIG. 12 is an end view of FIG. 11 as seen on the line 12—12 thereof.

Referring to FIGS. 9 and 11 in particular, it will be seen the socket members 100 may be connected to the elongated support members 104 in a number of different ways in order to accommodate, for example, a standard, desired transverse spacing between the projection members 102 to a variety of different transverse spacings of the chassis frame members 14 of different makes and models of automotive vehicles. Therefore, by transversely offsetting the socket members 100 in different directions than different distances transversely with respect to the longitudinal axis of the members 104, it will be seen that a wide variety of different transverse spacings between the socket members 100 may be achieved. This variety of spacings also may further be varied by connecting the bracket plates 106 to different sides of the elongated support members 104,for example,and thereby further vary the transverse spacings between opposite pairs of socket members 100 for any spacific type of automotive vehicle having a certain transverse spacing between the rear portions of the chassis frame members 14 thereof.

In comparing FIGS. 9 and 11 with respect to the foregoing description, it is to be observed thaat said arrangements are not, for example, opposite pairs of socket members 100 and support members 104 for a given spacing of chassis frame members 14. Rather, they are different, individual illustrations of socket members to be used on similar sides of different spacings of chassis frame members on different vehicles. Also, it will be seen from FIGS. 9 and 11 that various bracings gussets 112 which are of angular configuration extend between the socket members 100 and the rearward end portions of the elongated support members 104 and welded thereto as well as being welded in relation to a transversely extending plate 114 for example to provide additional strength between members 100 and 104.

Figure 13:
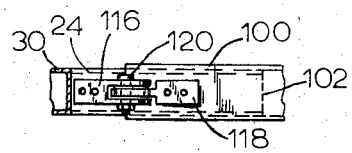
FIG. 13 is a fragmentary top plan view showing the embodiment of securing means by which the interconnected members of the attaching means are held in operative position, as seen on the line 13—13 of FIG. 6.

From the foregoing, it will be seen that sets comprising respectively left hand and right hand combined socket members 100 and the elongated support members 104 may be provided in inventory, said sets each having the same transverse distance between the axes of the socket members 100 and the elongated supported members 104 but different sets, respectively adapted to be used with different makes and models of various automotive vehicles respectively having different transverse spacings between the chassis frame member, will be stocked by dealers. Thus, an individual set of said composite members will be selected for a particular make and model of vehicle for which said set is intended and, by connecting the support members 104 to the rear portions of the chassis frame members of the vehicle, it will be found that the transverse spacing between the axes of the socket members 100 thereof will precisely coincide with the transverse distance between the axes of the projection members 104 on the hitch frame 22 which, for example, will be of standard size, as referred to above. The projection members 102 are safely retained in connected relationship with respect to socket members 100 by several possible arrangements, one of which comprises a clevis member 116 which is connected, for example, to forward extentions of the side members 24 of hitch frame 22, as shown in FIG. 6, which receives the tongue of a bracket 118 which is secured to the rearward end of the socket members 100 for example. A connecting pin or bolt 120 extends between suitable aligned holes in the clevis and tongue of said bracket, as clearly shown in FIG. 6 and 13. If desired, an additional hole 122 may be drilled through the opposite side walls of socket members 100 and also through the projection member 102 received therein for the reception of a safety pin or bolt of suitable type.

From the foregoing description, it will be seen that the present invention provides a tow hitch for fifth wheel type trailers which incorporates means by which a standard type and size of tow hitch mechanism comprising a hitch frame 22 and upstanding side members 30 which, by seeral embodiments, respectively support a fifth wheel hitch 46 and including spring tensioned auxiliary supporting wheels may be connected to the rearward portions of chassis frame members 14 of a substantial range of transverse spacings as found in different makes and models of automotive vehicles. Such connection is accomplished by means of only a limited range of sets of composite socket members 100 and elongated support members 104 being required respectively in accordance with the transverse spacings of the rearward portions of chassis frame members of a selected automotive vehicle to which the tow hitch is to be connected. Such selected set of composite socket and support members, when connected to the chassis frame members of the vehicle will receive the projections members 102 of the tow hitch mechanism.

As a further advantage for purposes of adapting the tow hitch mechanism to different makes and models of automotive vehicles having different heights, for example, of the upper surfaces of trunk compartments, the invention also employs means requiring only a very limited inventory of selectable sets of abutment support members 76 which are connected to cap shells 74 to be affixed to the upper ends of the upstanding vertical end members 30 of the hitch frame of the tow hitch mechanism, the angular relationship of said abutment support members on said cap shells being varied relative to the horizontal in the different composite sets of said cap shells and support members so as to dispose the forward ends of the cantilever frame 56 in suitable position with respect to the upper surface of the trunk compartment of an individual, selected vehicle without engaging said trunk compartment, while the cantilever frame 56 will be the same for a wide range of different makes and models of automotive vehicles when connected to a selected set of composite cap shells and abutment support members thereon. Otherwise, if desired, in the embodiment of the invention shown in FIGS. 4 and 5, the fifth wheel hitch 46 may be directly supported by the upper ends of the vertical end members 30' which is supported by the hitch frame 22 of the first mentioned embodiment. Said latter embodiment permits opening of the deck cover 96 of the trunk compartment without interference by the forward end of the fifth wheel type trailer.

While the invention has been described and illustrated in its several preferred embodiments, it should be understood that the invention is not to be limited to the precise details herein illustrated and described since the same way be carried out in other ways falling within the scope of the invention as illustrated and described.

I claim:

1. A tow hitch mechanism for attaching a fifth wheel type trailer to the rear portionof the chassis of an automotive vehicle comprising in combination, a hitch frame adapted to extend transversely to the longitudinal axis of such vehicle adjacent the rear end thereof, auxiliary wheels supported by the lower portion of said frame for engagement with a roadway, means upstanding from said hitch frame adjacent the rear end of such vehicle when said hitch frame is attached thereto, cantilever frame means supported by the upper end of said upstanding means and extending forwwardly therefrom relative to said vehicle, a fifth wheel hitch supported by said cantilever frame means at a height arranged to support the forward end of a fifth wheel type trailer at a lever in which the trailer is substantially level longitudinally when connected thereto, and coupling means includng interengageable members respectively connected to said hitch frame and interconnectable to the rear portion of the chassis frame members of such vehicle.

2. The hitch mechanism according to claim 1 in which said upstanding means comprise similar upstanding members respectively connected to said hitch frame at opposite sides thereof, and said fifth wheel hitch extending between the upper end portions of said upstanding members.

3. The hitch mechanism according to claim 2 in which said fifth wheel hitch comprises a transverse member extending substantially horizontally between said upstanding members and the opposite ends of said transverse member being supported in yokes provided on the upper end portions of said upstanding members.

4. The hitch mechanism according to claim 1 in which said cantilever frame means has a length to position the forward portion thereof above the rear trunk section of a passenger type vehicle when said hitch mechanism is connected thereto, whereby the forward portion of a fifth wheel trailer will overlie said trunk section and thereby foreshorten the overall length of such vehicle and trailer.

5. The hitch mechanism according to claim 1 in which said cantilever frame is pitovally connected to the upper portions of said upstanding members of said hitch frame and adpated to be pivotally moved rearwardly with respect to said upstanding members to provide ready access to the trunk area of such passenger type vehicle.

6. The hitch mechanism according to claim 5 in which said cantilever frame is provided with side members engageable respectively with the rear surface of said upstanding members of said hitch frame, thereby to limit rearward and downward pitovtal movement of said cantilever frame and brace the same in rearwardly extending postion from said upstanding members to permit reception of a load upon the upper portion of said rearwardy extended cantilever frame.

7. The hitch mechanism according to claim 6 in which means are provided on the upper end portions of said upstanding members of said hitch frame adapted to be engaged by said side members of said cantilever frame for support thereby when said cantilever frame is extended in overlying relationship with respect to the trunk section of a passenger type vehicle to which the hitch mechanism is connected.

8. The hitch mechanism according to claim 4 in which the forward end portion of said cantilever frame is provided with means at opposite sides thereof to support said fifth wheel hitch, said fifth wheel hitch comprising a member extending substantially horizontally between said opposite sides of the forward end portion of said cantilever frame.

9. The hitch mechanism according to claim 8 in which the opposite ends of said transversely extending fifth wheel hitch member are provided with trunnions, and said forward end portions of said cantilever frame being provided at opposite sides thereof with yokes respectively comprising bearings receiving said trunnions on the ends of said transverse fifth wheel hitch member to support the same for a limited rotary movement about a horizontal axis.

10. The hitch mechanism according to claim 1 in which said hitch mechanism also includes cap shells telescopically fitting over the upper end portions of said side members, and upwardly and forwardly extending abutment support members being connected to one side of said cap shells for engagement by portions of opposite sides of said cantilever frame to position the forwardly extending portion of said cantilever frame in overhanging relationship to the rear trunk section of a passenger type vehicle when said hitch mechanism is connected thereto.

11. The hitch mechanism according to claim 10 in which opposite sides of said cantilever frame are pivotally connected to said cap shells adjacent the rearward ends of said shells to support the rearward ends of the opposite sides of said cantilever frame and the fifth wheel hitch members supported thereby at a desired position overlying said trunk section of a passenger type vehicle when connected thereto.

12. The hitch mechanism according to claim 11 in which said abutment support members are fixed to said cap shells at an angle to the horizontal in accordance with the shape and height of the rear trunk section of a passenger type vehicle when connected thereto and thereby dispose the transverse fifth wheel hitch member on said cantilever frame in a desired overlying relationship with respect to said trunk section and thereby minimize inventory of said hitch mechanisms for connection of the same to a wide range of different shapes and sizes of trunk sections of passenger type vehicles to which the hitch mechanism is to be connected.

13. The hitch mechanism according to claim 12 in which said cap shells closely interfit and enclose the upper end portions of said upstanding side members of said hitch frame, and said hitch mechanism further including means interconnecting said cap shells and upstanding side members to secure said shells thereto and thereby adapt specific cap members and angular abutment support members thereon to a basic hitch frame substantially of common dimensions for attachment to a relatively wide range of different shapes and sizes of passenger type automotive vehicles having different transverse spaces between the opposite sides of the rear end portions of said vehicles.

14. The hitch mechanism according to claim 1 in which said coupling means comprise interfitting socket members and projection members, said socket members having attaching means fixedly connected to structural members of a vehicle chassis frame to which the hitch mechanism is to be connected, and projection members carried by the forward portion of said hitch frame and projecting forwardly for reception within the rearward ends of said socket members to effect connection between said hitch mechanism and such automotive vehicle, means to secure said interfitting members in connected relationship, said coupling members on one of said frames being spaced transversely a predetermined substantially fixed distance and the interfitting coupling members on the other frame being positioned on said attaching means in accordance with the spacing between the chassis frame members of the individual automotive vehicle to whiich said hitch mechanism is to be connected, thereby enabling said hitch mechanism to utilize a substantially standard size of hitch frame and enable the same to be connected to a substantial range of different widths of chassis frame members of a substantial range of different automotive vehicles.

15. The hitch mechanism according to claim 14 in which said attaching means on said socket members comprise elongated members adapted to extend longitudinally along surfaces of said vehicle chassis frame members, and bracket means spaced longitudinally along said elongated members and having holes therein adapted to be aligned with holes formed in said vehicle chassis frame members for the reception of bolts to secure said elongated members to said chassis frame members for relatively permanent connection thereto.

16. The hitch mechanism according to claim 15 in which said socket members are connected to the rearward ends of said elongated members and are axially offset laterally as required to align the socket members axially with the projection members on said hitch frame.

17. The hitch mechanism according to claim 16 further including reinforcing brace members between said socket members and offset elongated members to prevent lateral bending between the same.

18. The hitch mechanism according to claim 15 in which said elongated members are tubular and having parallel opposite sides, one of which is adapted to be disposed in flatly abutting relationship with a surface of one of said vehicle chassis frame members, and said bracket means comprising ears fixedly connected to said tubular elongated members and adapted to flatly abut one face of said vehicle chassis frame members for firm connection thereto.

19. The hitch mechanism according to claim 14 in which said tow hitch frame has transversely spaced longitudinal members at opposite sides thereof, upstanding side members projecting from said longitudinal members, axle bearings connected to the lower portions of said longitudinal members and adapted to support an axle for said auxiliary wheels for limited rotary movement within said bearings, and projection members extending forwardly from the forward ends of said longitudinal members of said tow hitch frame for reception within socket members connected to said vehicle chassis frame members.

20. The hitch mechanism according to claim 19 further including safety coupling means on said projection members and socket members adapted to prevent accidental separation thereof.

* * * * *